Walter A. Eaton
INVENTOR.

United States Patent Office 3,189,199
Patented June 15, 1965

3,189,199
PICK-UP TRUCK CAMPER BODY LOADER
Walter A. Eaton, 8612 Juanita Drive, Yakima, Wash.
Filed Oct. 18, 1962, Ser. No. 231,405
6 Claims. (Cl. 214—38)

This invention relates to a novel and useful pick-up truck camper body loader and is primarily designed for loading and unloading truck camper bodies.

The camper body loader of the instant invention comprises an upright base from whose upper portion an elongated support bed is mounted and the support bed includes means for slidably supporting a truck camper body for longitudinal reciprocal movement. In addition, one end of the support bed is pivotally secured to the base for movement about a horizontally disposed axis and lift means is interconnected between the other end of the support bed and the corresponding end of the base whereby the free end of the support bed may be raised and lowered. By providing a support along which a truck camper body may be slid longitudinally and a support having one end which may be raised and lowered, it is a relatively easy task to raise the one end of the support in horizontal alignment with the bed of a truck onto which the camper body is to be moved. After the support has been horizontally aligned with the truck bed, suitable means may be utilized to slide the camper body longitudinally of the support and onto the bed of the truck. Of course, the camper body may also be unloaded from the truck in a similar manner by reversing the above steps.

The camper body loader is provided with winch means having a winding drum with one end of an elongated flexible pull member wound thereabout. The loader also includes means for reeving the pull member in alternate ways in order that the winch means may be utilized both for pulling the camper body off a truck and onto the loader as well as off of the loader and onto the truck.

The main object of this invention is to provide a pick-up truck camper body loader which will be capable of supporting a camper body in an elevated position above ground level and in a manner whereby the camper body may be readily moved off of the loader and onto the bed of a truck and vice versa.

A further object of this invention, in accordance with the immediately preceding object, is to provide a camper body loader provided with an elongated support bed for supporting a camper body from beneath and constructed in a manner whereby the camper body may be readily slid longitudinally of the support bed to and from the load bed of a truck.

A still further object of this invention is to provide a camper body loader in accordance with the preceding objects having a support bed provided with means whereby one end thereof may be raised and lowered in order that the camper body supported thereby may be properly horizontally aligned with the load bed of a truck onto which it is being moved.

Still another object of this invention is to provide a loader including winch means having an elongated flexible pull member wound thereabout and with means being provided on the loader whereby the pull member may be alternately used to pull the camper body from the load bed of a truck and onto the loader as well as from the loader onto the load bed of a truck.

Still another object of this invention is to provide a camper body loader constructed in a manner whereby it may have ground-engaging support wheels mounted thereon for ease in mobility and enabling the loader to also be used as a boat trailer or the like.

A final object of this invention to be specifically enumerated herein is to provide a truck camper body loader in accordance with the preceding objects which will conform to conventional forms of manufacture, be of simple construction and easy to use so as to provide a device that will be economically feasible, long lasting and relatively trouble free in operation.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

Figure 1:
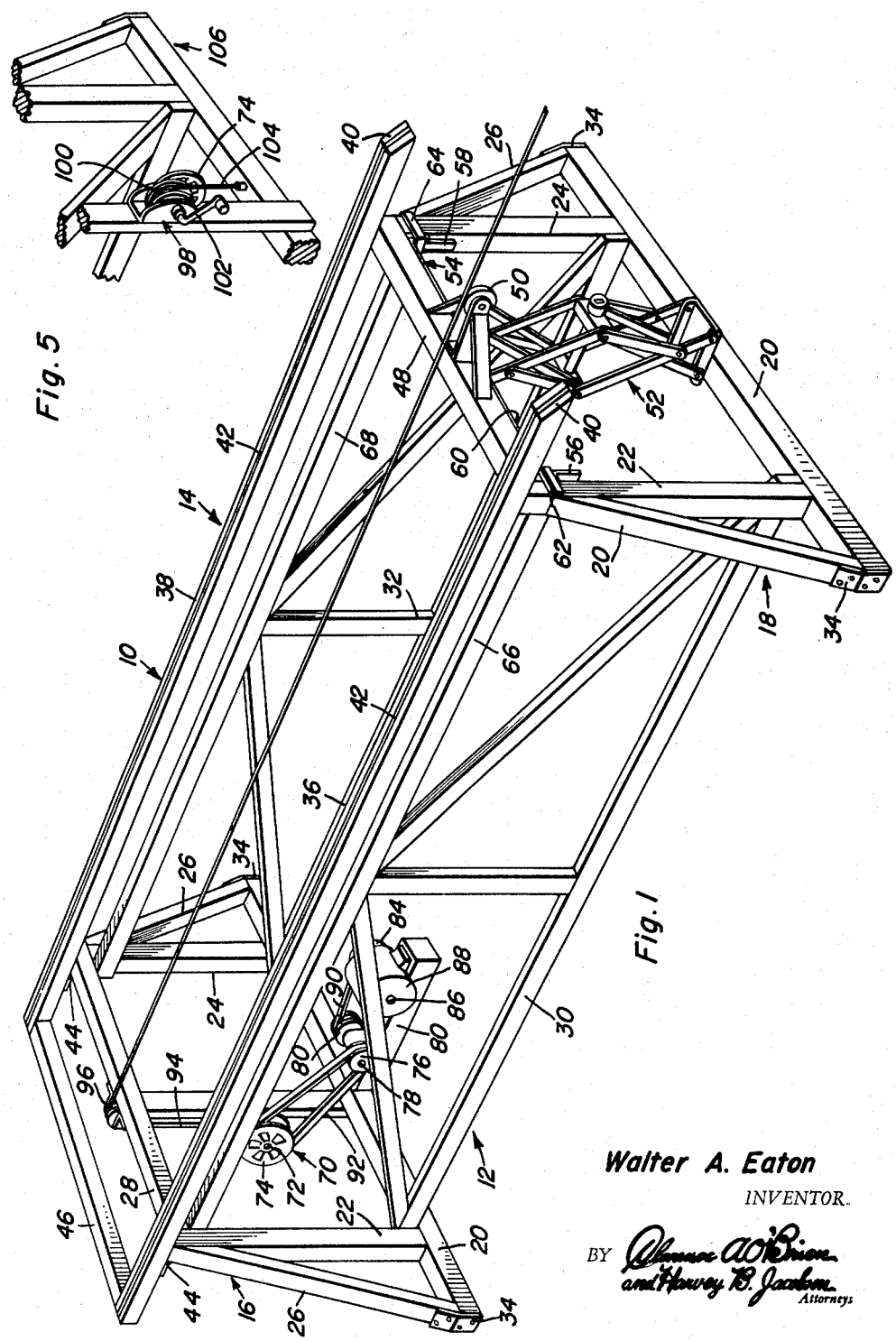
FIGURE 1 is a perspective view of the camper body loader of the instant invention.
Figure 4:
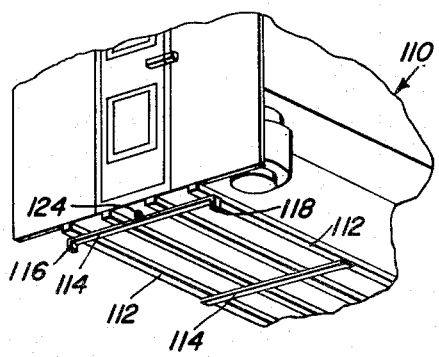

FIGURE 4 is a fragmentary perspective view of a conventional type of camper body showing the manner in which its frame may be modified to be more readily used in conjunction with the camper body loader of the instant invention; and FIGURE 5 is a fragmentary perspective view of a modified form of body loader showing the manner in which it may be equipped with a hand winch in lieu of the motorized winch illustrated in FIGURE 1.

Referring now more specifically to the drawings the numeral 10 generally designates the truck camper body loader of the instant invention. The loader 10 includes an elongated base generally referred to by the reference numeral 12 and an elongated support bed generally referred to by the reference numeral 14 is supported from the upper portion of the base.

The base 12 includes a pair of upstanding opposite and transversely extending end sections 16 and 18. Each of the end sections 16 and 18 includes a base member 20 and a pair of vertical uprights 22 and 24. The uprights 22 and 24 are spaced inwardly of the opposite ends of the base members 20 and have their upper ends interconnected to the adjacent ends of the corresponding base members by means of diagonal braces 26.

The upper ends of the uprights 22 and 24 of the end section 16 are interconnected by means of an upper transverse member 28 and corresponding pairs of uprights 22 and 24 are interconnected by means of a pair of upstanding longitudinally extending opposite side sections 30 and 32 respectively.

It may be seen from FIGURE 1 of the drawings that suitable bracing plates such as plates 34 may be utilized to assist in securing the lower ends of the diagonal brace members 26 to the opposite ends of the base members 20 and in other locations as desired.

The support bed 14 includes a pair of longitudinal slide and guide rails 36 and 38 which include bevelled end portions as at 40 and have strips of any suitable material such as strips 42 secured to their upper surfaces in any convenient manner. The strips 42 may be constructed of metal or other suitable substances for providing a bearing surface along which a camper body may be slid. The strips or guide rails 42 are pivotally secured to the uprights 22 and 24 of the end section 16 by means of hinges 44 and are interconnected adjacent the hinges 44 by means of a transverse brace member 46.

The ends of the slide and guide rails 42 remote from the transverse brace member 46 are interconnected by means of a transverse brace member 48 and it may be seen that the transverse brace member 48 has a pulley assembly 50 mounted thereon. In addition, from FIGURE 1 of the drawings it may be seen that the upper and lower ends of a scissors jack assembly generally referred to by the reference numeral 52 are secured to the transverse brace member 48 and the base member 20 of the end section 18. In this manner, the scissors jack assembly 52 may be utilized to raise and lower the adjacent end of the support bed 14.

It may also be seen from FIGURE 1 of the drawings that an inverted U-shaped guide member generally referred to by the reference numeral 54 is provided and is secured to the undersurface of the transverse brace member 48. The guide member 54 includes a pair of depending legs 56 and 58 which are interconnected at their upper ends by means of a bight portion 60. A pair of strap brackets 62 and 64 are secured to the upper ends of the uprights 22 and 24 and the adjacent ends of the upper members 66 and 68 of the side sections 30 and 32 and form upstanding recesses in which the legs 56 and 58 are receivable.

It is to be understood that the free end of the support bed 14 will normally be adjusted only small amounts in order to compensate for irregular terrain as the upper surface of the support bed 14 adjacent its free end will normally be disposed slightly below the average height of the bed of a truck onto which a camper body supported by the loader is to be moved.

From FIGURE 1 of the drawings it may be seen that a winch assembly 70 is provided and includes a winding drum (not shown) which is mounted on a shaft 72. The shaft 72 has a driven pulley 74 mounted thereon and the driven pulley 74 is aligned with a driving pulley 76 carried by one end of a cross-shaft 78 which is journalled for rotation from a mount 80 supported from the base 12. The other end of the cross-shaft 78 has a driven pulley 82 mounted thereon with which a pulley 84 mounted on the output shaft 86 of the electric motor 88 is aligned. The pulleys 82 and 84 are interconnected by means of a belt 90 and the pulleys 74 and 76 are interconnected by means of a belt 92. One end of a flexible pull member 94 is wound about the drum carried by the shaft 72 and the other end of the pull member 94 is passed over a pulley 96 supported from the transverse member 28 and the pulley assembly 50 supported from the transverse brace member 48.

With attention now directed to FIGURE 5 of the drawings there will be seen a modified form of winch assembly generally referred to by the reference numeral 98. The winch assembly 98 also includes a driven pulley 74 and also includes a winding drum 100. However, the winding drum 100 has a handcrank 102 operatively connected thereto in lieu of a motor such as motor 88 and a pull may be effected on the pull member 104 wound about the winding drum 100 by turning the crank or handle 102. The loader generally referred to by the reference numeral 106 and illustrated in FIGURE 5 of the drawings is otherwise substantially identical with the loader 10 and is provided with the hand-operated winch assembly 98 in lieu of the motorized winch assembly 90 only as an economy measure.

With attention now directed more specifically to FIGURE 4 of the drawings there will be seen a camper body generally referred to by the reference numeral 110. The camper body 110 is provided with the usual longitudinal skid members 112. However, inasmuch as the longitudinal skid members 112 are to be used in supporting the camper body 110 while sliding along a pair of parallel slide and guide rails such as slide and guide rails 42, a plurality of transversely extending slide members 114 have been secured across the longitudinal members 112. It will be noted that the rearmost transverse member 114 has been provided with downturned end portions 116 and 118. The downturned end portions 116 and 118 are designed to embracingly engage the remote surfaces of the slide and guide rails 42 in order to prevent lateral shifting of the rear end of the camper body 110 as it is being slid longitudinally of the rails 42.

Figure 2:
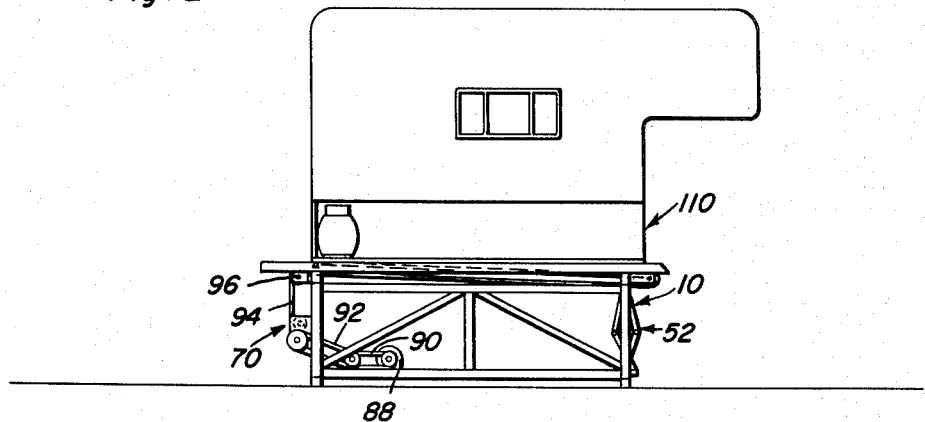
FIGURE 2 is a side elevational view of the camper body loader shown with a truck camper body positioned thereon.
Figure 3:
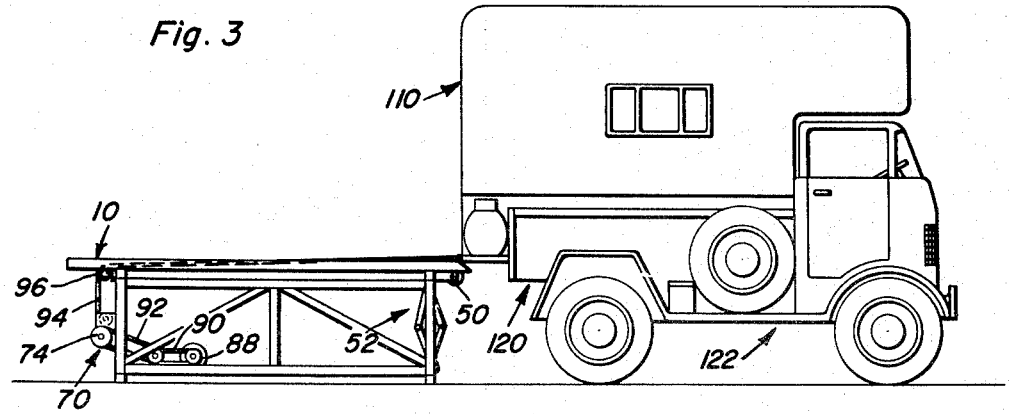
FIGURE 3 is a side elevational view of the truck camper body loader showing the manner in which it may be used to pull a camper body from the load bed of a truck.

With attention now directed to FIGURES 1 and 2 of the drawings, it may be seen that the camper body 110 is illustrated in FIGURE 1 of the drawings as being supported upon the loader 10. In FIGURE 3 of the drawings, the camper body 110 is illustrated being supported from the load bed 120 of a truck generally referred to by the reference numeral 122 just prior to the camper body 110 being pulled from the load bed 120 and onto the loader 10. The free end of the pull member 94 is secured to the pull ring 124 secured to the rear cross member 114, see FIGURE 4, and is being utilized to effect a rearward pull on the camper body 110. If the camper body were being loaded from the loader 10 onto the load bed 120 of the truck 122, the free end of the flexible pull member 94 would then be deflected approximately 180° about the pulley 50 and then secured to the pull member or eye 124. In this manner, the winding of the pull member 94 onto the winch assembly 70 will effect forward movement of the camper body 110 onto the truck 122.

As hereinbefore mentioned, it is contemplated that the loader 10 may be utilized as a boat trailer. In this instance, the transverse brace member 48 is to be replaced by a V-shaped brace member provided with suitable rollers for supporting a boat hull at the rear of the loader 10. In addition, other suitable transverse bracing between the side sections 30 and 32 may be provided and also equipped with supporting rollers to further support a boat hull positioned between the side sections 30 and 32. Additionally, a suitable wheeled supporting axle would be secured to the rear end of the loader 10 and a tongue assembly equipped with a hitch element would be secured to the front end of the loader 10.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention as claimed.

What is claimed as new is as follows:

1. A pick-up truck camper body loader for loading and unloading truck camper bodies, said loader comprising an elongated base adapted to be supported from the ground and including widespread leg means for steadying against lateral tilting, an elongated generally horizontal support bed including a pair of interconnected longitudinal slide and guide rails pivotally secured at one end to one end of said base for movement about a generally horizontally disposed axis extending transversely of said support bed, lift means interconnected between the other end of said bed and the corresponding end of said base for raising and lowering said other end relative to said base, said base comprising a pair of upstanding opposite end and transversely extending end sections interconnected at corresponding ends by means of a pair of upstanding longitudinally extending opposite side sections, said one end of said support bed being pivotally secured to the upper end of the corresponding end section, the other end of said bed and the corresponding end of said base including coacting guide means guiding said other end of said bed against lateral deflection, said coacting guide means comprising an inverted U-shaped member secured between the corresponding ends of said slide and guide rails and including a pair of depending legs whose remote surfaces are disposed in sliding contacting relation with a pair of opposing vertical guide surfaces defined by opposite end portions of the corresponding end section.

2. A pickup truck camper body loader for loading and unloading truck camper bodies, said loader comprising an elongated base adapted to be supported from the ground and including widespread leg means for steadying against lateral tilting, an elongated generally horizontal support bed including a pair of interconnected longitudinal slide and guide rails pivotally secured at one end to one end of said base for movement about a generally horizontally disposed axis extending transversely of said support bed, lift means interconnected between the other end of said bed and the corresponding end of said base for raising and lowering said other end relative to said base, and winch means carried by said base including a winding drum having one end of a flexible pull member wound therearound, said loader including reeving means adapted for alternately reeving said pull member for effecting a pull on the other end thereof in opposite directions longitudinally of said bed, said base comprising a pair of upstanding opposite end and transversely extending end sections interconnected at corresponding ends by means of a pair of upstanding longitudinally extending opposite side sections, said one end of said support bed being pivotally secured to the upper end of the corresponding end section, the other end of said bed and the corresponding end of said base including coacting guide means guiding said other end of said bed against lateral deflection, said coacting guide means comprising an inverted U-shaped member secured between the corresponding ends of said slide and guide rails and including a pair of depending legs whose remote surfaces are disposed in sliding contacting relation with a pair of opposing vertical guide surfaces defined by opposite end portions of the corresponding end section.

3. The combination of claim 2 wherein said bed slide and guide rails include smooth upper surfaces adapted to slidingly support a truck camper body.

4. The combination of claim 2 wherein all portions of said coacting guide means are disposed beneath said guide rails.

5. The combination of claim 2 wherein said winch means includes a motor drivingly connected to said drum by means of a high torque producing gearing assembly.

6. The combination of claim 5 wherein said gearing assembly also includes means adapted to have a crank handle removably secured thereto whereby said winch means may also be manually operated.

References Cited by the Examiner

UNITED STATES PATENTS

| | | | |
|---|---|---|---|
| 1,276,674 | 8/18 | Mentzer et al. | 214—38.22 |
| 1,342,628 | 6/20 | Hollaway | 214—38.22 X |
| 1,870,573 | 8/32 | Kuchar | 214—517 X |
| 2,347,437 | 4/44 | Saxe | 214—515 X |
| 2,689,965 | 9/54 | Fenton | 214—38.22 X |
| 2,925,929 | 2/60 | Romine | 214—38.22 X |
| 2,936,915 | 5/60 | Marsh | 214—85.1 |

FOREIGN PATENTS 903,653    10/45    France.

HUGO O. SCHULZ, *Primary Examiner.*

GERALD M. FORLENZA, *Examiner.*